United States Patent
Leoni et al.

(10) Patent No.: US 10,678,110 B2
(45) Date of Patent: *Jun. 9, 2020

(54) DISPLAY DEVICE

(71) Applicant: Hewlett-Packard Development Company, L.P., Houston, TX (US)

(72) Inventors: Napoleon J Leoni, Palo Alto, CA (US); Daniel Espinosa, Palo Alto, CA (US); Omer Gila, Palo Alto, CA (US); Raj Kelekar, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 108 days.

This patent is subject to a terminal disclaimer.

(21) Appl. No.: 15/763,104

(22) PCT Filed: Oct. 28, 2015

(86) PCT No.: PCT/US2015/057779
§ 371 (c)(1),
(2) Date: Mar. 24, 2018

(87) PCT Pub. No.: WO2017/074341
PCT Pub. Date: May 4, 2017

(65) Prior Publication Data
US 2018/0275479 A1    Sep. 27, 2018

(51) Int. Cl.
*G02B 26/00*  (2006.01)
*G02F 1/167*  (2019.01)
(Continued)

(52) U.S. Cl.
CPC ............ *G02F 1/167* (2013.01); *G02F 1/1343* (2013.01); *G02F 1/13338* (2013.01);
(Continued)

(58) Field of Classification Search
CPC .... G02F 1/167; G02F 1/13338; G02F 1/1343; G02F 1/1676; G02F 2001/1678; G06F 3/044
(Continued)

(56) References Cited

U.S. PATENT DOCUMENTS 8,248,349 B2    8/2012  Park et al.
8,872,991 B2    10/2014  Chen et al.
(Continued)

FOREIGN PATENT DOCUMENTS

CN    103091924 B    4/2015
KR    10-2006-0038111 A    5/2006
(Continued)

OTHER PUBLICATIONS

Panda DS—E-paper Driving Boards ; http://docs.visionect.com/_versions/2.3/VisionectPandaDS.html.

*Primary Examiner* — William Choi
(74) *Attorney, Agent, or Firm* — Dicke Billig & Czaja PLLC

(57) ABSTRACT

One example of a display device includes an electronic paper display, a counter-electrode, and a floating electrode. The electronic paper display is imageable by receiving charges on an imaging surface of the electronic paper display. The counter-electrode is opposite to the imaging surface of the electronic paper display. The floating electrode is capacitively coupled to the counter-electrode.

20 Claims, 4 Drawing Sheets

(51) Int. Cl.
G02F 1/1333    (2006.01)
G02F 1/1343    (2006.01)
G06F 3/044     (2006.01)
*G02F 1/1676*      (2019.01)
*G09G 3/34*        (2006.01)
*G02F 1/1675*      (2019.01)

(52) U.S. Cl.
CPC ............ G06F 3/044 (2013.01); *G02F 1/1676* (2019.01); *G02F 2001/1678* (2013.01); *G09G 3/344* (2013.01)

(58) Field of Classification Search
USPC ....................................................... 359/296
See application file for complete search history.

(56) References Cited

U.S. PATENT DOCUMENTS

| | | |
|---|---|---|
| 2012/0320001 A1 | 12/2012 | Gila et al. |
| 2013/0114124 A1 | 5/2013 | Suwald |
| 2014/0085261 A1 | 3/2014 | Lu et al. |
| 2015/0153876 A1 | 6/2015 | Chien et al. |
| 2018/0275478 A1* | 9/2018 | Gila ........................ G02F 1/167 |

FOREIGN PATENT DOCUMENTS

| | | |
|---|---|---|
| KR | 10-2009-0097252 A | 9/2009 |
| KR | 10-1224696 B1 | 1/2013 |
| WO | WO 2017/074341 A1 | 5/2017 |
| WO | WO-2017074311 | 5/2017 |

* cited by examiner

DISPLAY DEVICE

BACKGROUND

Electronic paper ("e-paper") is a display technology designed to recreate the appearance of ink on ordinary paper. Some examples of e-paper reflect light like ordinary paper and may be capable of displaying text and images. Some e-paper is implemented as a flexible, thin sheet, like paper. One familiar e-paper implementation includes e-readers.

DETAILED DESCRIPTION

Figure 1:
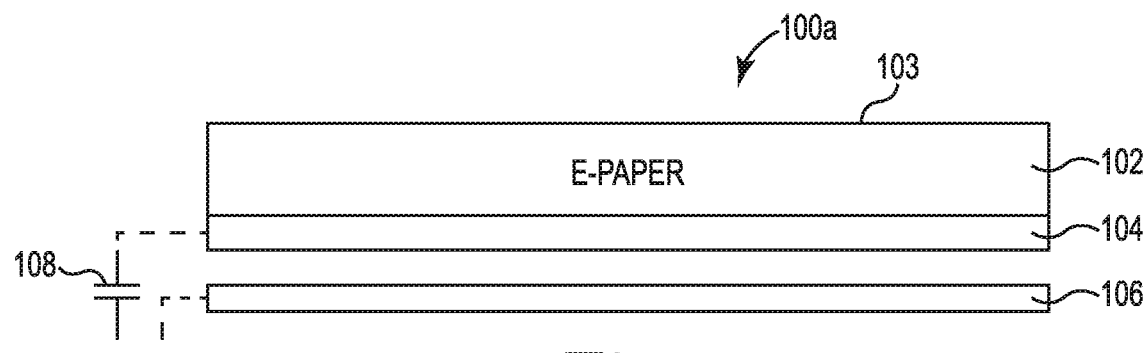
FIG. 1 is a schematic diagram illustrating one example of a display device.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Electronic paper ("e-paper") may be used in a variety of display applications such as signage, e-books, tablets, cards, posters, and pricing labels. E-paper has several paper-like features. For example, e-paper is a reflective display that uses ambient light as an illumination source. The ambient light strikes the surface and is reflected to the viewer. The usage of pigments similar to those that are used in printing allows the e-paper to be read at a wide range of angles and lighting conditions, including full sunlight. The use of ambient light also eliminates the need for illumination produced by the device, such as a backlight. This minimizes the power used by the e-paper. In addition, the e-paper does not use power to maintain the image. Once the image is written, the image remains on the e-paper for an extended period of time or until the e-paper is rewritten. Thus, a typical e-paper primarily uses power for changing the optical state of the e-paper.

One way to write to e-paper is by generating a charge on a surface in proximately to a layer of microcapsules that contain charged pigment particles while connecting the other side of the e-paper to ground or another suitable voltage. The charge on the surface attracts or repels the charged pigment particles in the microcapsules to create the desired image. To write to e-paper, a writing module used to write to the e-paper has to maintain a connection to a ground return path (e.g., a counter-electrode) for the e-paper during the writing (or erasing) phase. Once the image is created, the surface charges are no longer required to maintain the image and the charges typically dissipate or are discharged through the e-paper to the ground. If the e-paper image is undesirably disrupted after writing by the close proximity (e.g., 0-200 μm) of a charged object, such as a finger of a person who is statically charged, the position of the pigment particles (and thus the image) may be disturbed.

Accordingly, the following disclosure describes examples of e-paper display devices that are imageable by receiving charges on an imaging surface of the e-paper displays. The display device includes a counter-electrode opposite to the imaging surface of the e-paper display and a floating electrode capacitively coupled to the counter-electrode. The floating electrode is placed on the display device where first contact with a user is most likely to occur (i.e., on the front and/or back side of the display device). When the floating electrode is subjected to an electric field/charge transfer from a user, the counter-electrode is brought to substantially the same potential as the floating electrode. In this way, subsequent contact by the user to the imaging surface of the e-paper display will not result in disruption of an image of the e-paper display.

FIG. 1 is a schematic diagram illustrating one example of a display device 100a. Display device 100a includes an e-paper display 102, a counter-electrode 104, and a floating electrode 106. E-paper display 102 includes an imaging surface 103. The surface of e-paper display 102 opposite to imaging surface 103 contacts counter-electrode 104. Floating electrode 106 is on the same side of e-paper display 102 as counter electrode 104 but does not directly contact counter-electrode 104.

E-paper display 102 includes an active layer that switches color when electrical charges are applied to imaging surface 103. In one example, the active layer contains a switchable pigment or die combination. A resin or polymer may be used to encapsulate the active layer. In addition, e-paper display 102 may include a functional coating on the imaging surface. In one example, e-paper display 102 has a thickness between 70 μm and 300 μm. One example of e-paper display 102 is further described below with reference to FIG. 6.

Counter-electrode 104 provides an electrode for the imaging of e-paper display 102 by a writing module. During writing of e-paper display 102, counter charges flow to counter-electrode 104 from a writing module. Thus, display device 100a remains basically charge neutral despite charges being ejected onto imaging surface 103. Without a connection between counter-electrode 104 and the writing module, the amount of charges that may be ejected onto imaging surface 103 may be limited and thus information may not be reliably written to display device 100a. Counter-electrode 104 may be composed of a transparent conductive material, such as indium tin oxide. In one example, counter-electrode 104 has a thickness between 5 μm and 1 μm.

Floating electrode 106 is capacitively coupled to counter-electrode 104 as indicated by capacitor 108. Floating electrode 106 provides an area of display device 100a that a user is likely to touch when first contacting display device 100a. When a user touches floating electrode 106, floating electrode 106 is brought to the same potential as the user. Through the capacitive coupling to counter-electrode 104, counter-electrode 104 is brought to substantially the same potential as floating electrode 106. By bringing counter-electrode 104 to substantially the same potential as floating electrode 106, e-paper display 102 becomes insensitive to a future contact of the user's finger onto imaging surface 103 and subsequent electric field/charge transfer between the user and imaging surface 103 of e-paper display 102 is minimized. Thus, the user's ability to alter the displayed image of e-paper display 102 by handling display device 100a is reduced. Floating electrode 106 may be composed of a transparent conductive material, such as a thin (e.g., less than 10 μm) conductive coating (e.g., indium tin oxide or a conductive polymer) deposited onto a clear insulating substrate. In one example, the clear insulating substrate has a thickness between 50 μm and 500 μm.

Figure 2:
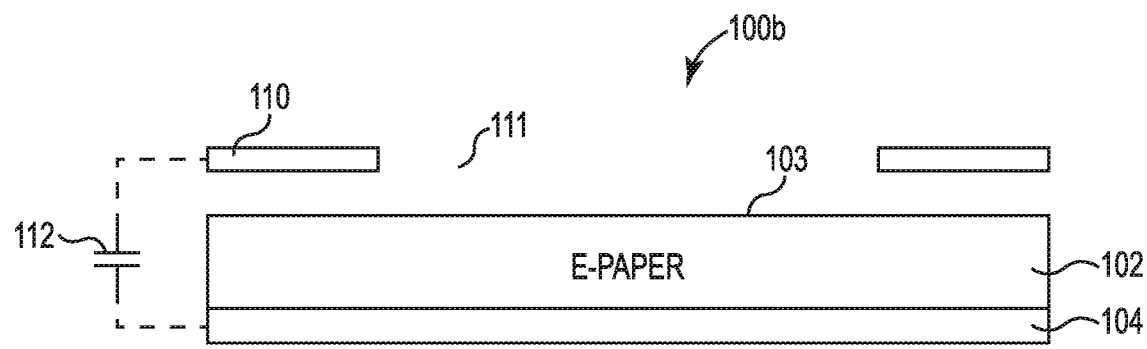
FIG. 2 is a schematic diagram illustrating another example of a display device.

FIG. 2 is a schematic diagram illustrating another example of a display device 100b. Display device 100b is similar to display device 100a previously described and illustrated with reference to FIG. 1, except that display device 100b includes a floating electrode 110 in place of floating electrode 106. Floating electrode 110 is on the same side of e-paper display 102 as imaging surface 103. Floating electrode 110 includes an opening 111 exposing imaging surface 103 of e-paper display 102 to allow e-paper display 102 to be written.

Floating electrode 110 is capacitively coupled to counter-electrode 104 as indicated by capacitor 112. Floating electrode 110 provides an area of display device 100b that a user is likely to touch when first contacting display device 100b. When a user touches floating electrode 110, floating electrode 110 is brought to the same potential as the user. Through the capacitive coupling to counter-electrode 104, counter-electrode 104 is brought to substantially the same potential as floating electrode 110. By bringing counter-electrode 104 to substantially the same potential as floating electrode 110, subsequent electric field/charge transfer between the user and imaging surface 103 of e-paper display 102 is minimized. Thus, the user's ability to alter the displayed image of e-paper display 102 by handling display device 100b is reduced. Floating electrode 110 may be composed of a transparent conductive material, such as a thin conductive material (e.g., indium tin oxide), a polycarbonate with bulk conductivity or surface conductivity, or an opaque conductive material, such as a metal.

Figure 3:
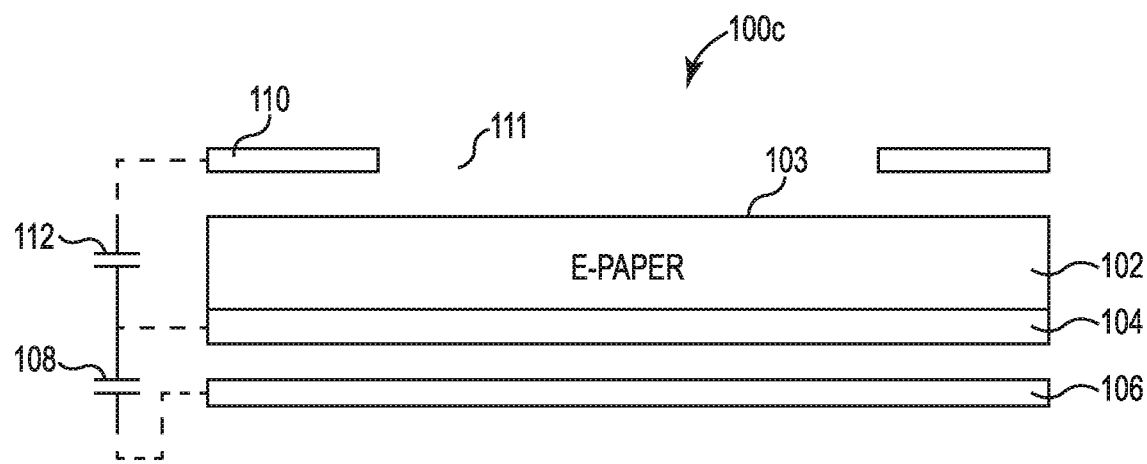
FIG. 3 is a schematic diagram illustrating another example of a display device.

FIG. 3 is a schematic diagram illustrating another example of a display device 100c. Display device 100c includes both a floating electrode 106 previously described and illustrated with reference to FIG. 1 and a floating electrode 110 previously described and illustrated with reference to FIG. 2. Floating electrodes 106 and 110 provide areas of display device 100c that a user is likely to touch when first contacting display device 100c. When a user touches floating electrode 106 and/or floating electrode 110, through capacitive coupling counter-electrode 104 is brought to substantially the same potential as floating electrode 106 and/or floating electrode 110. Thus, the user's ability to alter the displayed image of e-paper display 102 by handling display device 100c is reduced.

Figure 4:
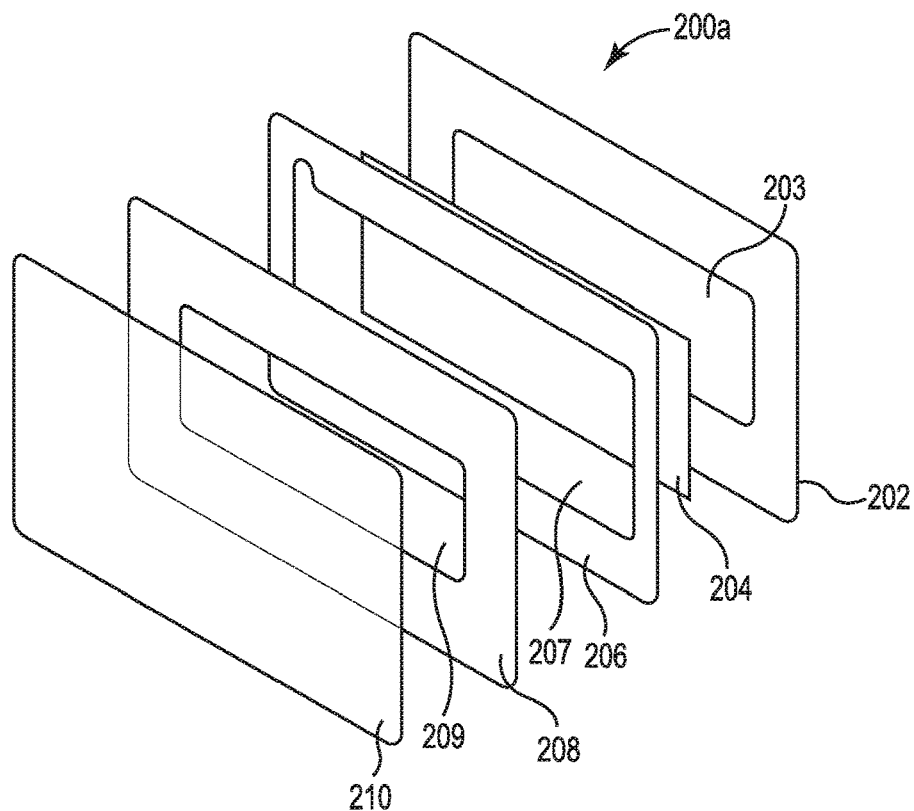
FIG. 4 is an exploded view illustrating one example of a display device.

FIG. 4 is an exploded view illustrating one example of a display device 200a. Display device 200a includes a first layer 202, an e-paper display 204, a second layer 206, a third layer 208, and a floating electrode 210. First layer 202 includes an opening 203 to expose the imaging surface of e-paper display 204. First layer 202 may be composed of a nonconductive transparent or opaque material, such as a transparent or opaque polymer. Ink may be applied to first layer 202 either on the surface of first layer 202 facing away from second layer 206 or on the surface of first layer 202 facing second layer 206 (e.g., for a transparent first layer 202). First layer 202 is attached to second layer 206 and may cover a portion of e-paper display 204 around the edges of e-paper display 204.

E-paper display 204 includes a counter-electrode opposite to the imaging surface and facing third layer 208. E-paper display 204 is supported in an opening 207 of second layer 206. Second layer 206 may be composed of a conductive material, such as a metal or a polycarbonate. The counter-electrode of e-paper display 204 is electrically coupled to second layer 206. Third layer 208 is attached to second layer 206 and covers e-paper display 204. Third layer 208 includes a transparent window 209 to e-paper display 204 to enable viewing of e-paper display 204. Third layer 208 may be composed of a nonconductive transparent material, such as a transparent polymer. Ink may be applied to the edges of third layer 208 to provide a printed region defining window 209. The ink may be applied to third layer 208 either on the surface of third layer 208 facing away from second layer 206 or on the surface of third layer 208 facing second layer 206.

Floating electrode 210 is attached to third layer 208. In one example, floating electrode 210 is a conductive coating that is applied to third layer 208. In another example, floating electrode 210 is a conductive film that is applied to third layer 208. Floating electrode 210 is capacitively coupled to the counter-electrode of e-paper display 204. Floating electrode 210 provides an area of display device 200a that a user is likely to touch when first contacting display device 200a. When a user touches floating electrode 210, floating electrode 210 is brought to the same potential as the user. Through the capacitive coupling to the counter-electrode of e-paper display 204, the counter-electrode is brought to substantially the same potential as floating electrode 210. By bringing the counter-electrode to substantially the same potential as floating electrode 210, subsequent electric field/charge transfer between the user and the imaging surface of e-paper display 204 is minimized. Thus, the user's ability to alter the displayed image of e-paper display 204 by handling display device 200a is reduced. Floating electrode 210 may be composed of a transparent conductive material, such as indium tin oxide or a polycarbonate.

In one example, first layer 202, second layer 206, third layer 208, and floating electrode 210 may be attached to each other via an adhesive material between each of the layers, such as a pressure sensitive adhesive or a two part adhesive. In another example, first layer 202, second layer 206, third layer 208, and floating electrode 210 may be attached to each via thermal lamination, ultrasonic bonding/welding, or another suitable bonding method. In this example, display device 200a has the form of a transaction card, such as a credit card, debit card, prepaid card, or gift card. In other examples, display device 200a may have another suitable form, such as a shelf tag, boarding pass, shipping label, or large format flexible rewritable display.

Figure 5:
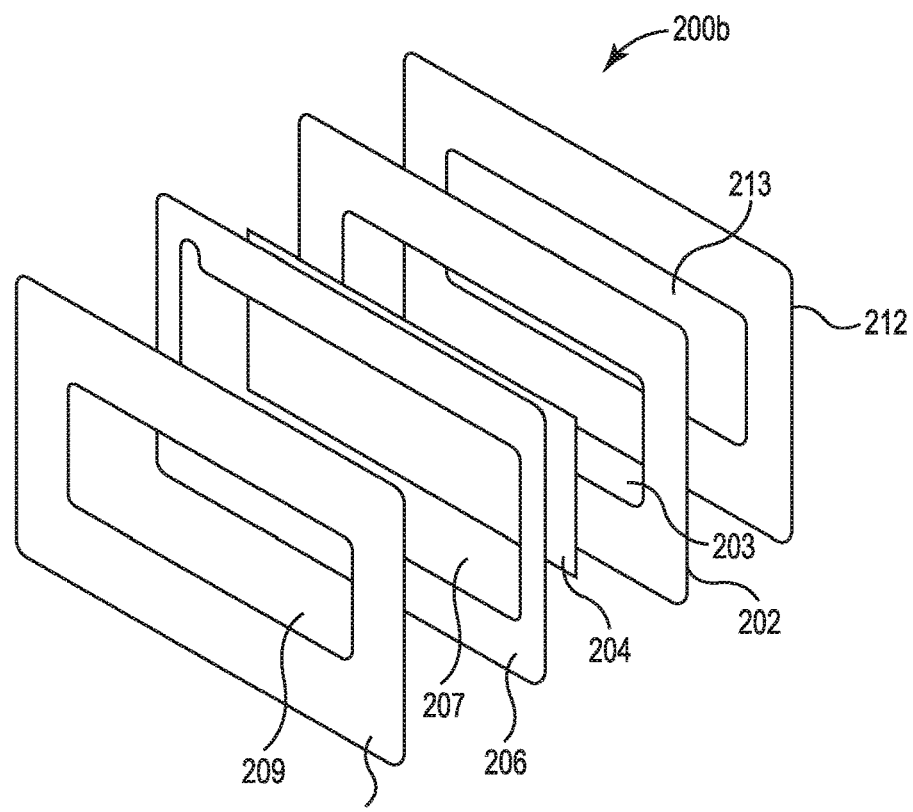
FIG. 5 is an exploded view illustrating another example of a display device.

FIG. 5 is an exploded view illustrating another example of a display device 200b. Display device 200b is similar to display device 200a previously described and illustrated with reference to FIG. 4, except that display device 200b includes a floating electrode 212 in place of floating electrode 210. Floating electrode 212 is attached to first layer 202. Floating electrode 212 includes an opening 212 exposing the imaging surface of e-paper display 204 to allow e-paper display 204 to be written.

In one example, floating electrode 212 is a conductive coating that is applied to first layer 202. In another example, floating electrode 212 is a conductive film that is applied to first layer 202. Floating electrode 212 is capacitively coupled to the counter-electrode of e-paper display 204. Floating electrode 212 provides an area of display device 200b that a user is likely to touch when first contacting display device 200b. When a user touches floating electrode 212, floating electrode 212 is brought to the same potential as the user. Through the capacitive coupling to the counter-electrode of e-paper display 204, the counter-electrode is brought to substantially the same potential as floating electrode 212. By bringing the counter-electrode to substantially the same potential as floating electrode 212, subsequent electric field/charge transfer between the user and the imaging surface of e-paper display 204 is minimized. Thus, the user's ability to alter the displayed image of e-paper display 204 by handling display device 200b is reduced. Floating electrode 212 may be composed of a transparent conductive material, such as indium tin oxide or a polycarbonate, or an opaque conductive material, such as a metal. In another example, display device 200b may include a floating electrode 210 attached to third layer 208 as previously described and illustrated with reference to FIG. 4 in addition to floating electrode 212.

Figure 6:
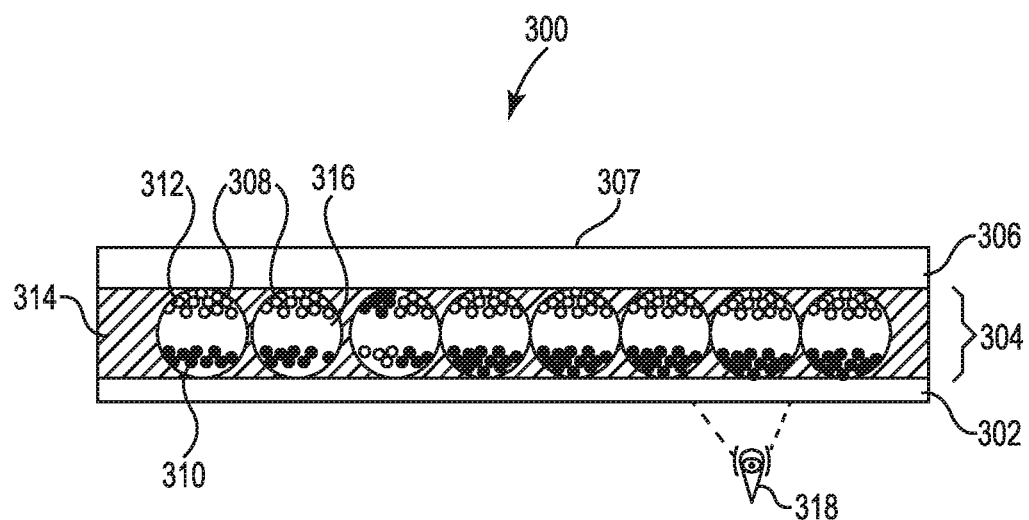
FIG. 6 is a cross-sectional view illustrating one example of an electronic paper ("e-paper") display.

FIG. 6 is a cross-sectional view illustrating one example of an e-paper display 300. In one example, e-paper display 300 is used in display device 100a, 100b, 100c, 200a, or 200b previously described and illustrated with reference to FIGS. 1-5, respectively. E-paper display 300 includes a transparent counter-electrode 302, an active layer 304, and a transparent charge receiving layer 306. Active layer 304 includes microcapsules 308 encapsulated by a resin or polymer 314 or other material that can hold the carrying liquid, which is typically a dielectric liquid such as isoparaffinic fluids. In one example, each microcapsule 308 includes black particles 310 and white particles 312 suspended in a fluid medium 316. Surface 307 of charge receiving layer 306 provides the imaging surface for e-paper display 300. Counter-electrode 302 provides the viewing side for a viewer 318 in this example. In other examples, charge receiving layer 306 may provide the viewing side for a viewer.

Ambient light is transmitted through counter-electrode 302, strikes microcapsules 308, and is reflected back to the viewer 318. When white particles 312 of a microcapsule 308 are located near counter-electrode 302, the microcapsule appears white to a viewer 318. When black particles 310 of a microcapsule 308 are located near counter-electrode 302, the microcapsule appears black to the viewer 318. The particles 310 and 312 have opposite charges. For example, black particles 310 can be positively charged particles, and white particles 312 can be negatively charged particles. Various shades of gray can be created by varying the arrangement of alternating microcapsules with white and black particles located near counter-electrode 302 to produce halftoning.

Microcapsules 308 exhibit image stability using chemical adhesion between particles and/or between the particles and the microcapsule surface. For example, microcapsules 308 can hold text and images indefinitely without using electricity, while allowing the text or images to be changed later.

The structure, materials, and dimensions of the various layers and components of e-paper display 300 may be adapted to specific design criteria. In one example, the transparent charge receiving layer 306 may be composed of a transparent polymer and may have a thickness between 50 µm and 250 µm. The transparent charge receiving layer 306 may also be composed of a material that holds charges or is porous or semi-porous to charges and/or ions.

The diameter of each microcapsule 308 is substantially constant within e-paper display 300 and can be in one example between 20 µm and 100 µm, such as 50 µm. Counter-electrode 302 may be composed of a transparent conductive material, such as indium tin oxide. In one example, counter-electrode 302 has a thickness between 10 nm and 1 mm, or larger depending on how e-paper display 300 is to be used.

In other examples, e-paper display 300 has a variety of other configurations. For example, each microcapsule 308 may include black particles suspended in a white colored fluid. The black particles can be positively charged particles or negatively charged particles. One or more microcapsules form a pixel of black and white images displayed on e-paper display 300. The black and white images are created by placing black particles near or away from counter-electrode 302. For example, the microcapsules with black particles located away from counter-electrode 302 reflect white light, corresponding to a white portion of an image displayed on e-paper display 300. In contrast, the microcapsules with black particles located near counter-electrode 302 appear black to a viewer 318 corresponding to a black portion of the image displayed on e-paper display 300. Various shades of gray can be created by using halftoning with black particles located near or away from counter-electrode 302.

Counter-electrode 302 may be tinted with alternating blue, red, and green regions. Adjacent blue, red, and green regions form color pixels. Color images are created by placing different combinations of white or black particles near counter-electrode 302. For example, the microcapsules of a color pixel with white particles located near the red and green regions of counter-electrode 302 reflect red and green light from e-paper display 300. The viewer 318 will perceive this combination as a yellow pixel. When the black particles in the microcapsules are located near counter-electrode 302, that color pixel will appear black to the viewer 318. Additionally or alternatively, the black particles 310 of each microcapsule can be replaced by blue, red, or green positively or negatively charged particles. The particles can be used alone or in combination with a tinted counter-electrode 302 to create a desired color image.

Figure 7:
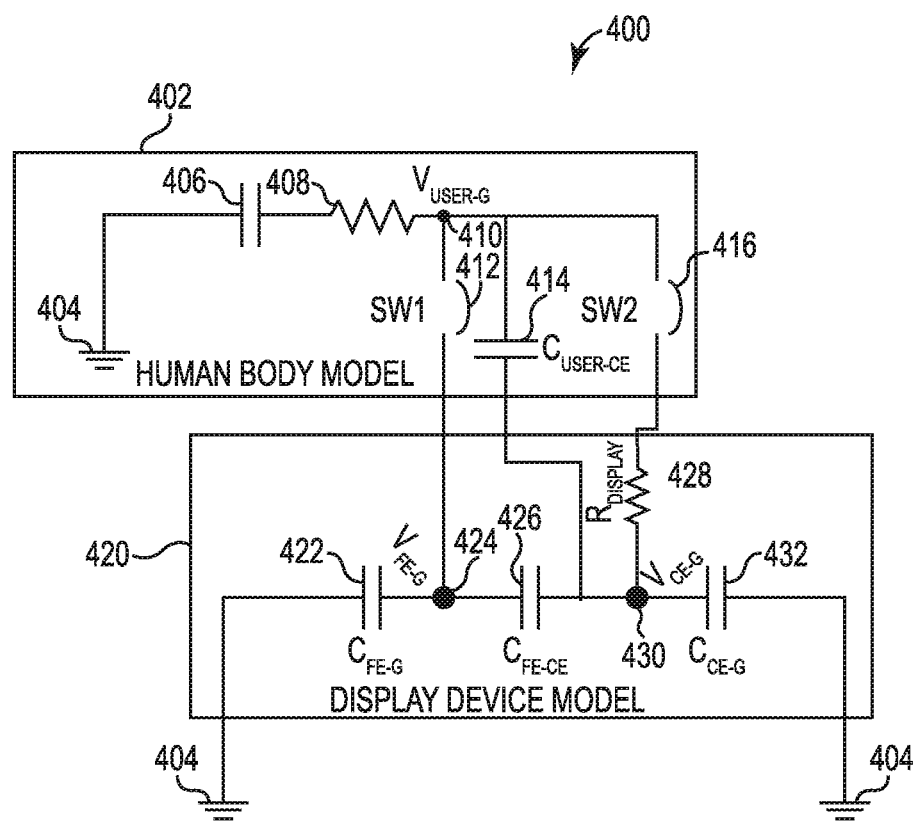
FIG. 7 is a schematic diagram illustrating one example of a lumped capacitance model including a human body model and a display device model.

FIG. 7 is a schematic diagram illustrating one example of a lumped capacitance model 400 including a human body model 402 and a display device model 420. Lumped capacitance module 400 is provided to illustrate the operation of display device 100a, 100b, 100c, 200a, and 200b previously described and illustrated with reference to FIGS. 1-5, respectively. Human body module 402 includes a capacitor 406, a resistor 408, a switch (SW1) 412, a capacitor ($C_{USER-CE}$) 414 and a switch (SW2) 416. Display device model 410 includes a capacitor ($C_{FE-G}$) 422, a capacitor ($C_{FE-CE}$) 426, a resistor ($R_{DISPLAY}$) 428, and a capacitor ($C_{CE-G}$) 432.

One terminal of capacitor 406 is electrically coupled to ground 404, and the other terminal of capacitor 406 is electrically coupled to one terminal of resistor 408. The other terminal of resistor 408 is electrically coupled to one terminal of switch 412, one terminal of capacitor 414, and one terminal of switch 416. The other terminal of switch 416 is electrically coupled to one terminal of resistor 428. The other terminal of switch 412 is electrically coupled to one terminal of capacitor 422 and one terminal of capacitor 426. The other terminal of capacitor 422 is electrically coupled to ground 404. The other terminal of capacitor 414 is electrically coupled to the other terminal of capacitor 426, the other terminal of resistor 428, and one terminal of capacitor 432. The other terminal of capacitor 432 is electrically coupled to ground 404.

Capacitor 406 and resistor 408 provide an equivalent circuit for an electrostatic discharge test device based on the human body model. In one example, capacitor 406 is a 100 pF capacitor and resistor 408 is a 1.5 kOhm resistor. Switch (SW1) 412 represents contact between a user and a floating electrode (FE) of a display device. Switch (SW2) 416 represents contact between the user and the imaging surface of the display device. Capacitor ($C_{USER-CE}$) 414 represents the capacitance between the user and the counter-electrode of the display device. Capacitor ($C_{FE-G}$) 422 represents the capacitance between the floating electrode of the display device and ground. Capacitor ($C_{FE-CE}$) 426 represents the capacitance between the floating electrode and the counter-electrode of the display device. Resistor ($R_{DISPLAY}$) 428 represents the effective resistance of the e-paper display. Capacitor ($C_{CE-G}$) 432 represents the capacitance between the counter-electrode of the display device and ground.

The potential $V_{USER-G}$ on node 410 represents the potential between the user and ground. The potential $V_{FE-G}$ on node 424 represents the potential between the floating electrode of the display device and ground. The potential $V_{CE-G}$ on node 430 represents the potential between the counter-electrode of the display device and ground.

Initially when the display device containing the e-paper is in a wallet or not in the hands of a user, the potentials $V_{FE-G}$ and $V_{CE-G}$ are most likely close to ground. To prevent disruption of the image of the e-paper of the display device, the current that flows from the user to the counter-electrode through the display (i.e., $R_{DISPLAY}$) should be reduced, since this is the current that causes the image of the e-paper display to be disrupted. If the counter-electrode potential $V_{CE-G}$ is brought to the same level as the user potential $V_{USER-G}$ before a contact is made through SW2 (i.e., user contact to the imaging surface) there would be no current across $R_{DISPLAY}$ and thus the image would not be disrupted. This is accomplished by the display devices of the current disclosure by including a floating electrode, which is capacitively coupled to the counter-electrode.

By ensuring by accessibility, area, and location that the most likely first contact between a user and the display device happens across SW1 (i.e., to the floating electrode), there will be a charge transfer between the user and the floating electrode and $V_{FE-G}$ will be brought to the same level as $V_{USER-G}$. Due to the capacitive coupling between the floating electrode and the counter-electrode, the potential of the counter-electrode $V_{CE-G}$ also changes due to the charge transfer. Since $C_{FE-CE}$ and $C_{CE-G}$ form a capacitive divider to ground, if $C_{FE-CE} \gg C_{CE-G}$, then $V_{CE-G}$ will become very close to $V_{FE-G}$ and thus to $V_{USER-G}$. These potentials and the ensuing charge transfers and currents may be calculated from this simplified model using parallel plane capacitance formulae. These calculations yield that the ratio between the charge transferred to the e-paper if the user contacts the e-paper first compared to when the user contacts the floating electrode first and then the e-paper is about 120x.

Figure 8:
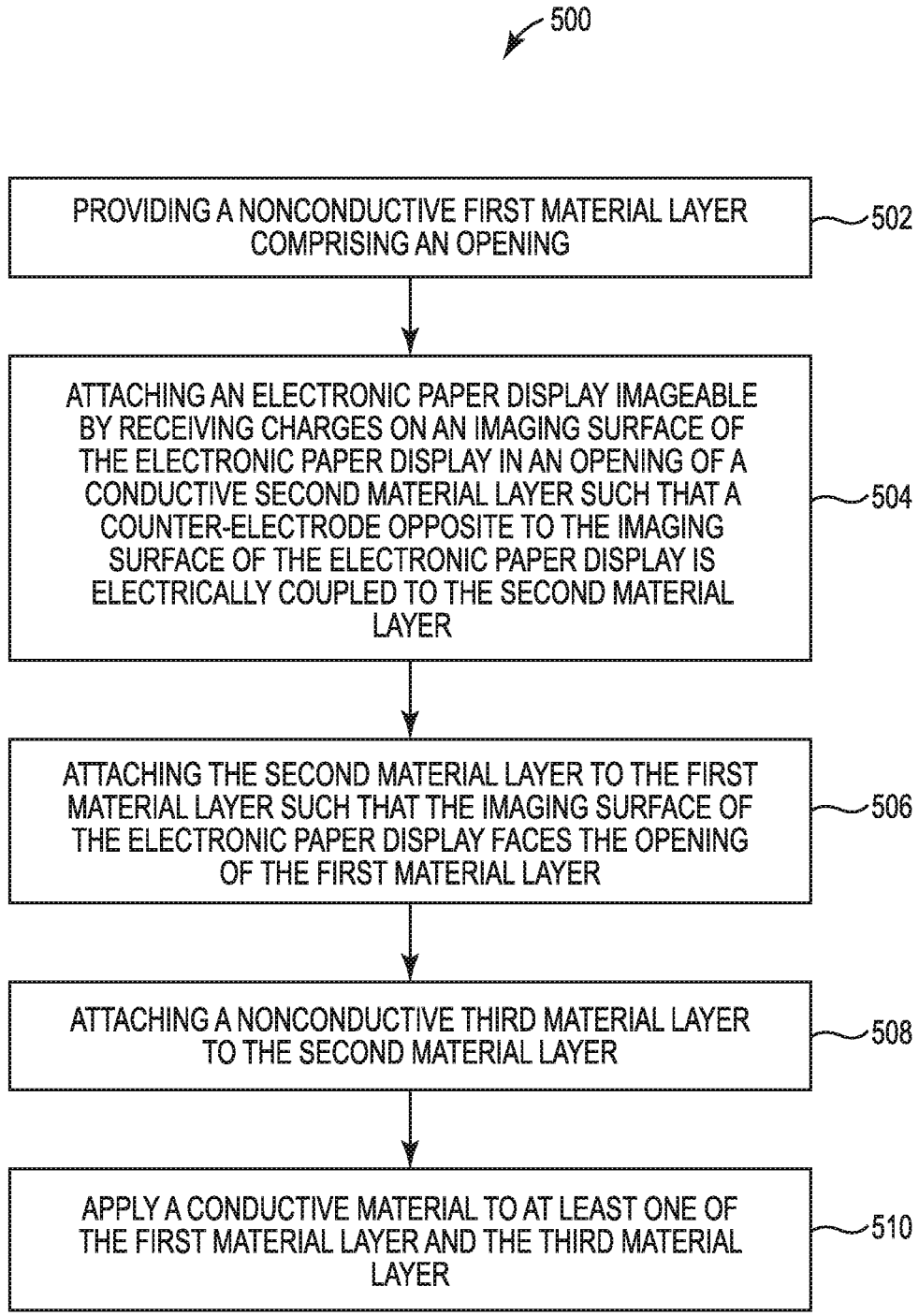
FIG. 8 is a flow diagram illustrating one example of a method for manufacturing a display device.

FIG. 8 is a flow diagram illustrating one example of a method 500 for manufacturing a display device. At 502, method 500 includes providing a nonconductive first material layer comprising an opening. At 504, method 500 includes attaching an electronic paper display imageable by receiving charges on an imaging surface of the electronic paper display in an opening of a conductive second material layer such that a counter-electrode opposite to the imaging surface of the electronic paper display is electrically coupled to the second material layer. At 506, method 500 includes attaching the second material layer to the first material layer such that the imaging surface of the electronic paper display faces the opening of the first material layer. In one example, attaching the second material layer to the first material layer comprises attaching the second material layer to the first material layer via an adhesive.

At 508, method 500 includes attaching a nonconductive third material layer to the second material layer. In one example, attaching the third material layer to the second material layer comprises attaching the third material layer to the second material layer via an adhesive. At 510, method 500 includes applying a conductive material to at least one of the first material layer and the third material layer. In one example, applying the conductive material comprises applying a transparent conductive material to at least one of the first material layer and the third material layer.

By including a floating electrode capacitively coupled to the counter-electrode of the e-paper display of the display device, image robustness of the display device is improved by preventing electrostatic discharges from users from altering the image when the display device is handled by a user.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A display device comprising:
   an electronic paper display imageable by receiving charges ejected from a writing module onto an imaging surface of the electronic paper display;
   a counter-electrode opposite to the imaging surface of the electronic paper display; and
   a floating electrode capacitively coupled to the counter-electrode.

2. The display device of claim 1, wherein the counter-electrode is between the electronic paper display and the floating electrode.

3. The display device of claim 1, wherein the floating electrode comprises a transparent conductive material.

4. The display device of claim 1, wherein the floating electrode comprises indium tin oxide or a polycarbonate.

5. The display device of claim 1, wherein the floating electrode comprises an opening to expose the imaging surface of the electronic paper display.

6. The display device of claim 1, further comprising:
   a further floating electrode capacitively coupled to the counter-electrode, wherein the floating electrode is arranged on a first side of the electronic paper display and the further floating electrode is arranged on a second side of the electronic paper display opposite to the first side.

7. A display device comprising:
   a first layer having an opening;
   a second layer attached to the first layer, the second layer supporting an electronic paper display imageable by receiving charges on an imaging surface of the electronic paper display through the opening of the first layer;
   a third layer attached to the second layer opposite to the first layer, the third layer having a transparent window to the electronic paper display; and
   a floating electrode capacitively coupled to a counter-electrode of the electronic paper display.

8. The display device of claim 7, wherein the floating electrode is attached to the first layer.

9. The display device of claim 7, wherein the floating electrode is attached to the third layer.

10. The display device of claim 7, wherein the floating electrode prevents disruption of an image of the electronic paper display when the display device is handled by a user.

11. The display device of claim 7, further comprising:
a further floating electrode capacitively coupled to the counter-electrode of the electronic paper display, wherein the floating electrode is attached to the first layer, and
wherein the further floating electrode is attached to the third layer.

12. The display device of claim 7, wherein the first layer comprises a polymer, wherein the second layer comprises a conductive material electrically coupled to the counter-electrode of the electronic paper display, and
wherein the third layer comprises a polymer.

13. A method of manufacturing a display device, the method comprising:
providing a nonconductive first material layer comprising an opening;
attaching an electronic paper display imageable by receiving charges on an imaging surface of the electronic paper display in an opening of a conductive second material layer such that a counter-electrode opposite to the imaging surface of the electronic paper display is electrically coupled to the second material layer;
attaching the second material layer to the first material layer such that the imaging surface of the electronic paper display faces the opening of the first material layer;
attaching a nonconductive third material layer to the second material layer; and
applying a conductive material to at least one of the first material layer and the third material layer.

14. The method of claim 13, wherein applying the conductive material comprises applying a transparent conductive material to at least one of the first material layer and the third material layer.

15. The method of claim 13, wherein attaching the second material layer to the first material layer comprises attaching the second material layer to the first material layer via an adhesive, and
herein attaching the third material layer to the second material layer comprises attaching the third material layer to the second material layer via an adhesive.

16. A display device comprising:
an electronic paper display imageable by receiving charges on an imaging surface of the electronic paper display;
a counter-electrode opposite to the imaging surface of the electronic paper display;
a floating electrode capacitively coupled to the counter-electrode; and
a further floating electrode capacitively coupled to the counter-electrode, wherein the floating electrode is arranged on a first side of the electronic paper display and the further floating electrode is arranged on a second side of the electronic paper display opposite to the first side.

17. The display device of claim 16, wherein the counter-electrode is between the electronic paper display and the floating electrode.

18. The display device of claim 16, wherein the floating electrode comprises a transparent conductive material.

19. The display device of claim 16, wherein the floating electrode comprises indium tin oxide or a polycarbonate.

20. The display device of claim 16, wherein the floating electrode comprises an opening to expose the imaging surface of the electronic paper display.

* * * * *